(12) United States Patent  
Cai

(10) Patent No.: US 12,120,768 B1  
(45) Date of Patent: Oct. 15, 2024

(54) OPENRAN PEER TO PEER CONTENT EXCHANGE

(71) Applicant: T-Mobile Innovations LLC, Overland Park, KS (US)

(72) Inventor: Zheng Cai, Fairfax, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 451 days.

(21) Appl. No.: 17/468,003

(22) Filed: Sep. 7, 2021

(51) Int. Cl.
| | |
|---|---|
| *H04W 4/00* | (2018.01) |
| *H04L 67/1074* | (2022.01) |
| *H04L 67/562* | (2022.01) |
| *H04W 76/14* | (2018.01) |
| *H04W 76/40* | (2018.01) |
| *H04W 84/04* | (2009.01) |

(52) U.S. Cl.
CPC ......... *H04W 76/40* (2018.02); *H04L 67/1078* (2013.01); *H04L 67/562* (2022.05); *H04W 76/14* (2018.02); *H04W 84/042* (2013.01)

(58) Field of Classification Search
None
See application file for complete search history.

(56) References Cited

U.S. PATENT DOCUMENTS

| | | | | |
|---|---|---|---|---|
| 10,686,717 | B1* | 6/2020 | Gohil | H04L 47/70 |
| 2004/0148344 | A1* | 7/2004 | Navar | H04L 67/1072 709/219 |
| 2007/0105577 | A1* | 5/2007 | Bonta | H04W 4/029 455/66.1 |
| 2009/0327346 | A1* | 12/2009 | Teinila | G06Q 30/02 |
| 2009/0328113 | A1* | 12/2009 | van de Klashorst | G06Q 30/0269 725/87 |
| 2013/0332257 | A1* | 12/2013 | Scheinost | G06Q 30/02 705/14.36 |
| 2020/0267691 | A1* | 8/2020 | Maeder | H04W 76/40 |

\* cited by examiner

*Primary Examiner* — Bob A Phunkulh

(74) *Attorney, Agent, or Firm* — Shook, Hardy & Bacon L.L.P.; Elena K. McFarland

(57) ABSTRACT

Systems and methods for initiating access to peer to peer content from at least one user device of a telecommunication network include a requestor user device and a cell site including a content exchange system. The content exchange system is structured to generate a broker notification, receive a content request associated with a requestor user device based on the broker notification, generate a content request notification, provide the content request notification to one or more user devices, receive a content fulfillment response based on the content request notification, and provide content access data associated with the provider user device, the content access data structured to initiate access, by the requestor user device, to the peer to peer content stored in the provider user device.

20 Claims, 5 Drawing Sheets

OPENRAN PEER TO PEER CONTENT EXCHANGE

SUMMARY

The present disclosure is directed, in part, to initiating access to peer to peer content from at least one user device of a telecommunication network, substantially as shown in and/or described in connection with at least one of the figures, and as set forth more completely in the claims.

In aspects set forth herein, a user device is connected to a telecommunication network. Typically, the user device is connected, by the telecommunication network, to a content server from which the user device receives (e.g., downloads) content that consumes a significant transport bandwidth. The user device then stores the content received from the content server. However, here, a content exchange system connected to one or more user devices received a content request associated with a requestor user device and provided content access data to initiate access, by the requestor user device, to the peer to peer content stored in a provider user device which eliminates the need for a user device to receive content provided by content centric applications from a content server and reduces the bandwidth, latency, etc. required to receive content.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
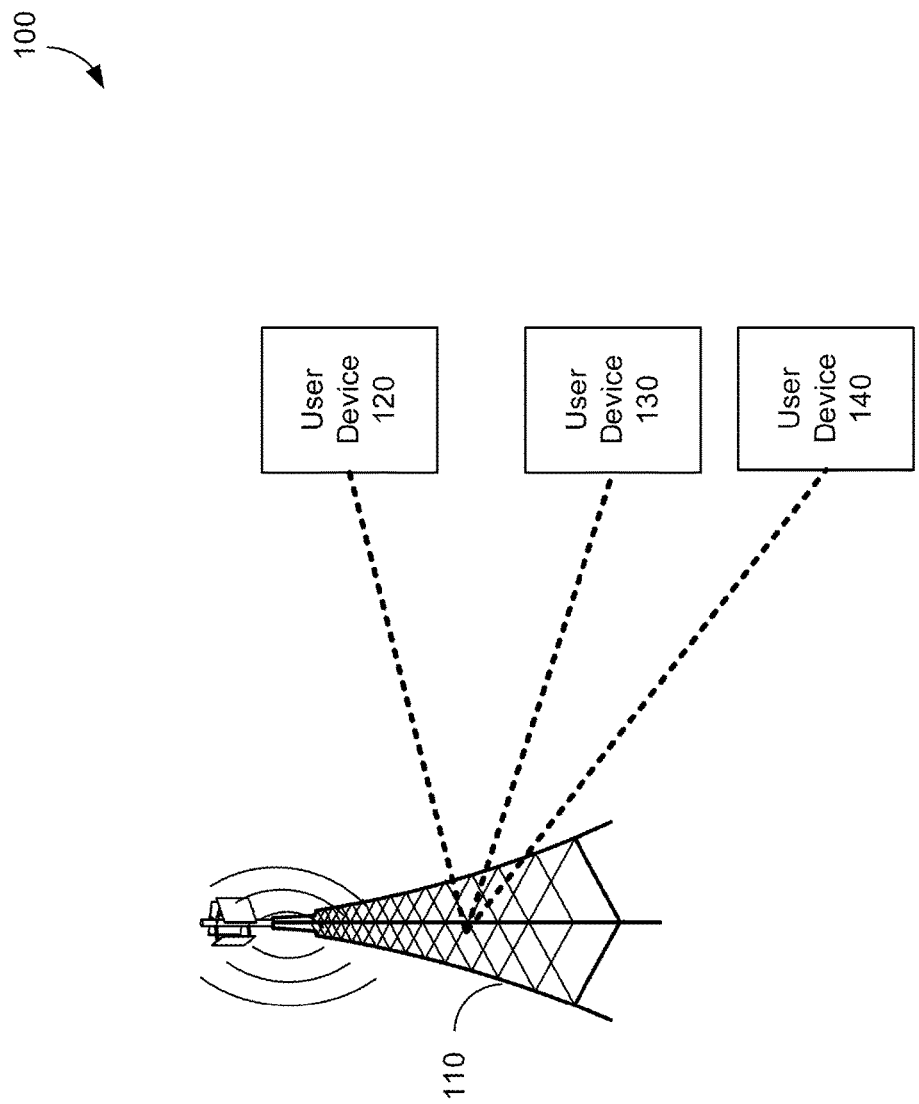
FIG. 1 depicts an example of a network environment in accordance with one or more embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for initiating access to peer to peer content from at least one user device of a telecommunication network (e.g., a telecom network). A broker notification is generated. The broker notification indicates the content exchange system is operable to receive one or more content requests. A content request associated with a requestor user device is generated based on the broker notification. A content request notification is generated. The content request notification is provided to the one or more user devices. A content fulfillment response is received based on the content request notification, the content fulfillment response indicates a provider user device that has stored the peer to peer content corresponding to the identification of the peer to peer content. Content access data associated with the provider user device is provided, the content access data is structured to initiate access, by the requestor user device, to the peer to peer content stored in the provider user device.

Advantageously, accessing peer to peer content from at least one user device of a telecommunication network reduces the bandwidth, latency, workload, and response time required for a requestor user device of the telecommunication network to receive content while eliminating the need for an edge infrastructure that requires content provided by content centric, latency stringent applications to be received from a content server.

In one aspect, a method is provided for initiating access to peer to peer content from at least one user device of a telecommunication network. The method includes generating, by a content exchange system communicatively coupled to one or more user devices, a broker notification. The method also includes receiving a content request associated with a requestor user device based on the broker notification, the content request including an identification of peer to peer content. The method further includes generating a content request notification, the content request notification including the content request received. The method further includes providing the content request notification to the one or more user devices. The method further includes receiving a content fulfillment response based on the content request notification, the content fulfillment response indicates a provider user device that has stored the peer to peer content corresponding to the identification of the peer to peer content. The method further includes, providing content access data associated with the provider user device, the content access data structured to initiate access, by the requestor user device, to the peer to peer content stored in the provider user device.

In another aspect, a computer-readable storage media having computer-executable instructions embodied thereon is provided that, when executed by one or more processors, cause the processors to perform various steps. The processors are caused to generate, by a content exchange system communicatively coupled to one or more user devices, a broker notification, wherein the broker notification indicates the content exchange system is operable to receive one or more content requests. The processors are also caused to receive a content request associated with a requestor user device based on the broker notification, the content request including an identification of peer to peer content. The processors are further caused to generate a content request notification, the content request notification including the content request received. The processors are further caused to provide the content request notification to the one or more user devices. The processors are further caused to receive a content fulfillment response based on the content request notification, wherein the content fulfillment response indicates a provider user device that has stored the peer to peer content corresponding to the identification of the peer to peer content. The processors are further caused to provide content access data associated with the provider user device, the content access data structured to initiate access, by the requestor user device, to the peer to peer content stored in the provider user device.

In yet another aspect, a system is provided for accessing peer to peer content from at least one user device of a telecommunication network. The system includes a requestor user device and a cell site including a content exchange system communicatively coupled to the requestor user device and a provider user device. The requestor user device receives a broker notification, wherein the broker notification indicates the content exchange system is operable to receive one or more content requests. The requestor user device also generates a content request based on the broker notification, the content request including an identification of peer to peer content. The requestor user device further receives a content fulfillment response based on the content request, wherein the content fulfillment response indicates the provider user device that has stored the peer to peer content. The requestor user device further receives content access data associated with the provider user device, the content access data structured to initiate access to the peer to peer content stored in the provider user device. The requestor user device further receives, based on the content access data, the peer to peer content stored in the provider user device.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 500 shown in FIG. 5. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, the UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 120, 130, and 140. In some embodiments, the network environment 100 may include a telecom network 110 (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as not to confuse other aspects of the present disclosure. Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The telecom network 110 included in the network environment 100 may include or otherwise may be accessible through a cell site. The cell site may include one or more antennas, base transmitter stations, radios, transmitter/receivers, digital signal processors, control electronics, GPS equipment, power cabinets or power supply, base stations, charging stations, etc. such that the cell site may provide a communication link between the one or more user devices (e.g., the user devices 120, 130, and 140) and other components, systems, equipment, and/or devices of the network environment 100. The base station and/or a computing device (e.g., whether local or remote) associated with the base station may manage or otherwise control the operations of components of the cell site.

In some embodiments, the cell site may be operable in a non-stand alone mode. In the non-stand alone (NSA) mode the network environment 100 may take the form of, for example, an E-UTRAN New Radio-Dual Connectivity (EN-DC) network. In an EN-DC network, a user device (e.g., the user device 120, 130, and/or 140) may connect to or otherwise access a 4G, LTE, 5G, or any other suitable network simultaneously. In the stand alone mode, the telecom network 110 may take the form of a 5G network or any other suitable network.

In some embodiments, the user device (e.g., the user device 120, 130, and/or 140) may take the form of a wireless or mobile device capable of communication via the network environment 100. For example, the user device 120 may take the form of a mobile device capable of communication via a telecom network (e.g., the telecom network 110) such as, but not limited to, a wireless telecommunication network. In this regard, the user device may be any mobile computing device that communicates by way of a network, for example, a 4G, LTE, WiMAX, 5G, 6G, or any other type of network.

In some embodiments, the network environment 100 may connect subscribers (e.g., current subscribers and/or potential subscribers) to a service provider or a plurality of service providers. Alternatively or additionally, the network environment 100 may be associated with a specific telecommunication provider or a plurality of telecommunications providers that provide services (e.g. 5G, voice, location, data, etc.) to one or more user devices. For example, the user devices 120, 130, and 140 may be subscribers to a telecommunication service provider, in which the user devices are registered or subscribed to receive voice and data services (e.g., receive content that may be streamed, downloaded, etc.) over the network environment 100. The network environment 100 may include any communication network providing voice and/or data service(s), such as, for example, a 4G network (LTE, WiMAX, HSDPA), 5G network, or 6G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular component or may be represented in a particular quantity in FIG. 1, it will be appreciated that some aspects may include a plurality of devices and/or components such that FIG. 1 should not be considered as limiting the quantity of any device and/or component.

Figure 2:
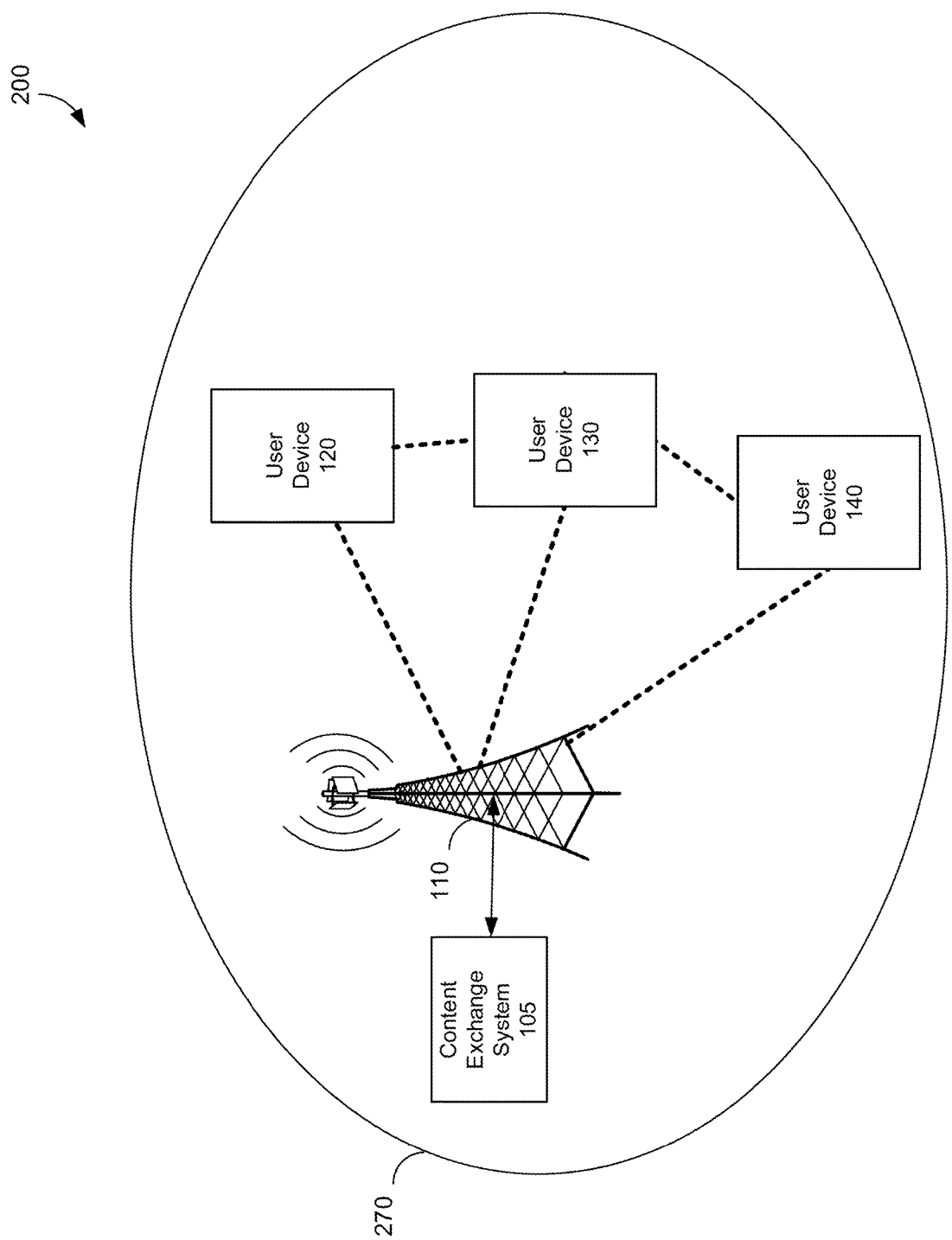
FIG. 2 is a diagram of a network environment including a plurality of user devices in accordance with an example embodiment.

FIG. 2 is a diagram of the network environment 200 (e.g., a telecommunication environment such as, but not limited to, a wireless telecommunication environment) according to an example embodiment. In the present embodiment, the network environment 200 includes the telecom network 110, content exchange system 105, one or more user devices 120, 130, and 140, and the geographic area 270. Although some of the components in the network environment 200 are depicted as multiple components (e.g., multiple user devices), in some embodiments, the network environment 200 may include one of such components.

In some embodiments, the network environment 100 may include a content exchange system (e.g., the content exchange system 105). The content exchange system may include one or more nodes communicatively coupled to the user device(s) 120, 130, and/or 140 such that the content exchange system may transmit to and receive requests and/or data from one or more user devices. The one or more nodes may include a Next Generation Node B (e.g., gNodeB or gNB) or any other suitable node structured to communicatively couple to the user device(s) 120, 130, and/or 140. The one or more nodes may correspond to one or more frequency bands. The frequency band may include a frequency range (e.g., a lower frequency and an upper frequency) within which the user device(s) may connect to the network environment such as, but not limited to, a telecommunication network or a portion thereof. The frequency range may be measured by the wavelength in the range.

The content exchange system 105 may be operable based on a Radio Access Network (RAN), Open Radio Access Network (OpenRAN), and/or any other suitable network. In some embodiments, the content exchange system 105 may manage the RAN, OpenRAN, or any other suitable network. The OpenRAN may include devices (e.g., RAN devices), components, circuitry, interfaces, programmatic code, cellular networks, and/or systems from a plurality of resources (e.g., providers, carriers, etc.) that may be interoperable.

In some embodiments, the content exchange system 105 may be included within the cell site 110, external to the cell site 110, or otherwise communicatively coupled to the cell site 110.

In some embodiments, the content exchange system 105 (e.g., a gNodeB or gNB) may generate a broker notification. The broker notification may indicate the content exchange system 105 is operable to receive one or more content requests. The broker notification may be provided to one or more user devices (the user device 120, 130, and/or 140) communicatively coupled to the content exchange system 105. In some examples, the user device(s) may connect to or otherwise register to the content exchange system 105. The content exchange system 105 may be communicatively coupled to the user device(s) such that the content exchange system 105 may transmit to and receive requests and/or data from one or more user devices. In this regard, the content exchange system 105 may provide the broker notification to the user device(s) such that the user device(s) may receive the broker notification. The user device(s) may include or otherwise may be operable by content client circuitry (e.g., by a content client function and/or other suitable circuitry) to communicate with the content exchange system 105.

Responsive to receiving the broker notification, the user device(s) (e.g., the user device 120) may move from an inactive exchange mode to an active exchange mode such that the user device may be operable to exchange content (e.g., peer to peer content) between the user device (e.g., a requestor user device such as the user device 120) and one or more secondary user devices (e.g., provider user device(s) such as the user devices 130 and/or 140).

In some embodiments, the content exchange system 105 may receive a content request associated with a user device (e.g., the requestor user device such as the user device 120) based on the broker notification. The user device (e.g., the requestor user device) may generate the content request based on the broker notification, for example, in response to the broker notification received. As used herein, the term "content request" may be used to refer to a request for peer to peer content. The term "peer to peer content" may be used to refer to an application, video, image, digital media, digital audio, virtual media, streaming media, and/or any other suitable media that may be stored in one or more user devices (e.g., the user devices 130 and/or 140). In some examples, the peer to peer content may include or otherwise may take the form of spatial content (e.g., content based on spatial computing) such as, but not limited to, augmented reality (AR), virtual reality (VR), extended reality (XR), mixed reality (MR), and/or any other suitable real and/or virtual environments. The content request may include an identification of the peer to peer content. For example, the content request may include a content identifier such as, but not limited to, a Uniform Resource Locator (URL) (e.g., a web address) that identifies the peer to peer content.

In some examples, the content exchange system 105 may generate a content request notification. The content request notification may include the content request received. In some embodiments, the content request notification may be included in or otherwise provided via a System Information Block (SIB) message in the gNB broadcast channel which is sent (e.g., transmitted) to the user device. Alternatively or additionally, the content request notification may include an IP address associated with the requestor user device (e.g., the user device 120).

In some embodiments, the content exchange system 105 may provide the content request notification to the one or more user devices. The content request notification (e.g., an announcement of a request for peer to peer content) may be provided to the user device(s) communicatively coupled to the content exchange system 105. Alternatively or additionally, the content request notification may be retrieved by the user device(s). In some embodiments, the content request notification may be provided to one or more user devices within a geographic area 270 associated with the content exchange system 105.

The content exchange system 105 may receive a content fulfillment response based on the content request notification. As used herein the term "content fulfillment response" may be used to refer to a response that indicates a user device that has stored the peer to peer content corresponding to the identification of the peer to peer content. For example, the content exchange system 105 may receive a content fulfillment response that indicates the provider user device (e.g., the user device 130) that has the peer to peer content (e.g., a video) stored. The content fulfillment response may be provided by the provider user device to the content exchange system. In some examples the content fulfillment response may include the IP address of the provider user device. The content exchange system 105 may provide an acknowledgment notification to the provider user device responsive to the content fulfillment response received.

In some embodiments, the user device (e.g., the requestor user device such as the user device 120) may receive the content fulfillment response based on the content request. The content fulfillment response may indicate the provider user device that has stored the peer to peer content. The requestor user device may receive or otherwise retrieve the content fulfillment response from the content exchange system 105.

In some embodiments, the content exchange system 105 may provide content access data associated with the provider user device. The content access data may be structured to initiate access, by the requestor user device, to the peer to peer content (e.g., a video) stored in the provider user device. In this regard, the requestor user device (e.g., the user device 120) may receive, for example, the IP address, port number, and content identifier (e.g., content ID) of the peer to peer content associated with the provider user device (e.g., the user device 130) to access the peer to peer content.

The requestor user device (e.g., the user device 120) may initiate access to the peer to peer content (e.g., a video) stored in the provider user device (e.g., the user device 130) based on the content access data. In turn, the requestor user device (e.g., the user device 120) may receive the peer to peer content stored in the provider user device (e.g., the user device 130). For example, the requestor user device may download, retrieve, or otherwise receive the peer to peer content (e.g., a video) stored in the provider user device. Advantageously, the provider user device that has the downloaded video(s) serves as a content server to the requestor user device.

Figure 3:
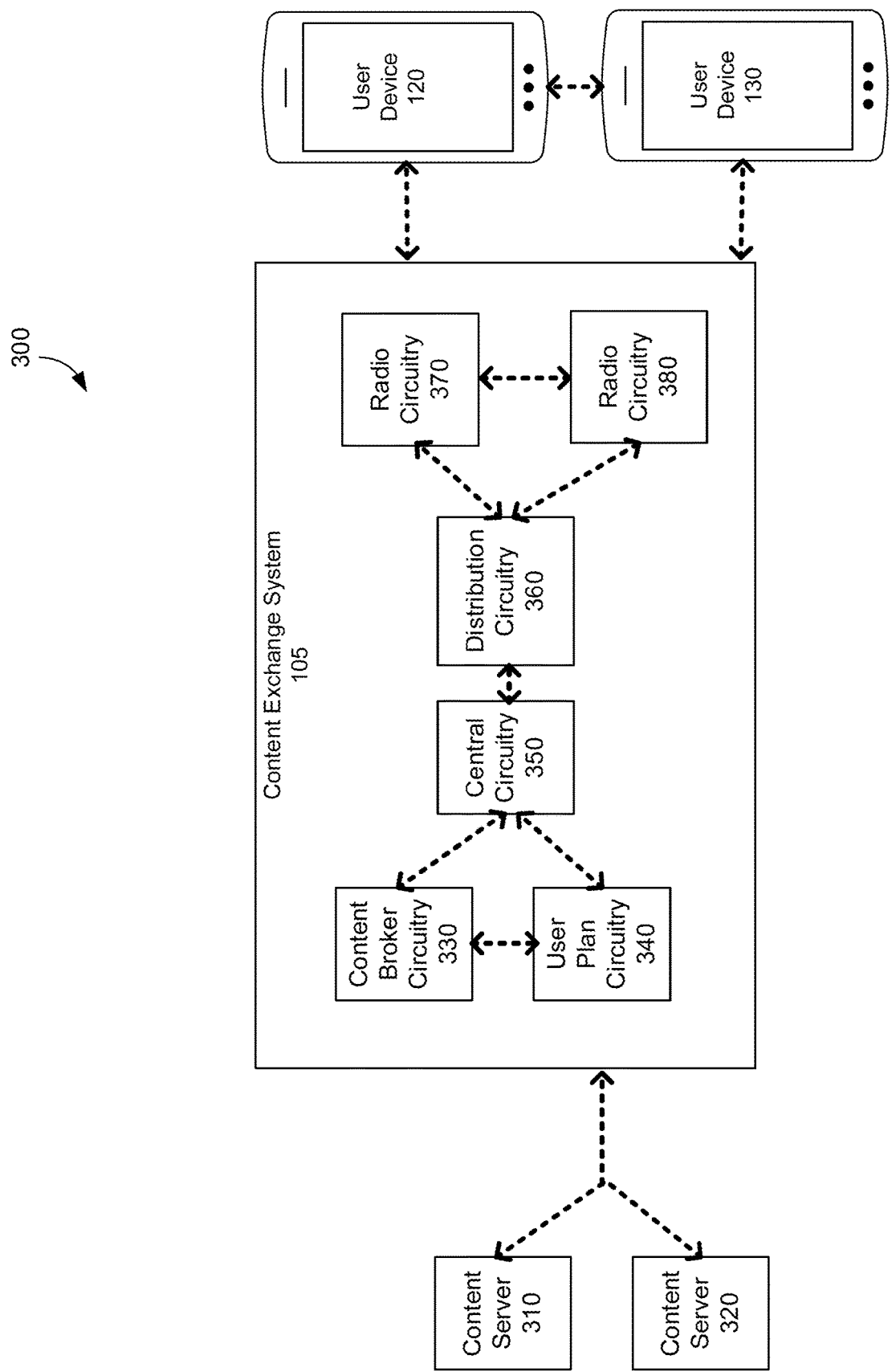
FIG. 3 is a diagram of a network environment including a content exchange system in accordance with an example embodiment.

FIG. 3 is a diagram of the network environment 300 (e.g., a telecommunication environment such as, but not limited to, a wireless telecommunication environment) according to an example embodiment. In the present embodiment, the network environment 300 includes the content exchange system 105, user devices 120, 130, content servers 310, 320, content broker circuitry 330, user plan circuitry 340, central circuitry 350, distribution circuitry 360, and radio circuitry 370 and 380. In some examples, the content exchange system 105 may include the user plan circuitry (e.g., a UPF function), content broker circuitry (e.g., a content broker server function), central circuitry (e.g., central unit), distribution circuitry (e.g., distribution unit), radio circuitry, and/or any other suitable circuitry.

The content exchange system 105 (e.g., a gNodeB or gNB) may generate a broker notification that indicates the content exchange system 105 is operable to receive one or more content requests. The broker notification may be provided to one or more user devices 120 and 130 communicatively coupled to the content exchange system 105. In some examples, the central circuitry 350 may broadcast, via a system information broadcast (SIB) channel, a broker notification that indicates the content exchange system 105 (e.g., gNB) is content broker capable. The central circuitry 350 may broadcast the broker notification in each cell associated with the content exchange system 105.

In some embodiments, if a user device (e.g., a requestor user device such as the user device 120) provides a content request to the content exchange system 105, the content request may be received by the content broker circuitry 330 (e.g., a content broker server function). If the content exchange system 105 is not operable to receive a content request, the content request may be provided, by the requestor user device, to the content server 310. In some examples, the user device 120 may provide a content request for peer to peer content (e.g., a video associated with a social platform). When the content request is received by the user plan circuitry 340 (e.g., a user plan function), the user plan circuitry 340, may verify the content request with the content broker circuitry 330 (e.g., content broker server function) to determine whether the peer to peer content is available in the content broker circuitry 330. If the peer to peer content is not available in the content broker circuitry 330, the user plan circuitry 340 will send an announcement to the central circuitry 350. Alternatively or additionally, a user device may receive the peer to peer content from a server.

In some examples, the content exchange system 105 may generate a content request notification (e.g., an announcement of a request for peer to peer content). The content broker circuitry 330 may provide the content request notification to the central circuitry 350 responsive to the content request received. The content request notification may include the content request received or information included in the content request.

In some embodiments, the content request notification may be provided, by the system information broadcast channel, to the user device(s) (e.g., the user device 130 and/or 140) communicatively coupled to the central circuitry 350 of the content exchange system 105. The content request notification may include or otherwise take the form of a system information block message. Alternatively or additionally, the content request notification may include an IP address associated with the requestor user device (e.g., the user device 120) that requested the peer to peer content such that the provider user device may identify and/or permit access to the requestor user device that may initiate access to the peer to peer content stored.

The content exchange system 105 may receive a content fulfillment response based on the content request notification. For example, the content exchange system 105 may receive a content fulfillment response provided by the provider user device (e.g., the user device 130) that has stored the peer to peer content (e.g., a video). The user device 130 may provide the content fulfillment response to the central circuitry 350 of the content exchange system 105. The content fulfillment response may include the IP address or any other suitable identifier of the provider user device.

In some examples, the content exchange system 105 may provide an acknowledgment notification to the provider user device (e.g., the user device 130) responsive to the content fulfillment response received. The acknowledgment notification may include the IP address or any other suitable identifier of the requestor user device. The provider user device may permit or otherwise open access to the requestor user device that is associated with IP address and/or other suitable identifier(s) provided in the acknowledgement notification.

Alternatively or additionally, the provider user device (e.g., the user device 130) may provide content access data associated with the provider user device to the content broker circuitry 330. In some embodiments, the content broker circuitry 330 may provide the content access data associated with the provider user device to the requestor user device. The content access data may be structured to initiate access, by the user device 120 (e.g., the requestor user device), to the peer to peer content (e.g., a video) stored in the provider user device (e.g., the user device 130). In some examples, the central circuitry 350 may provide the content access data associated with the provider user device to the requestor user device. In this regard, the requestor user device (e.g., the user device 120) may receive the content access data associated with the provider user device (e.g., the user device 130).

The requestor user device (e.g., the user device 120) may initiate access to the peer to peer content (e.g., a video) stored in the provider user device (e.g., the user device 130) based on the content access data. The requestor user device may initiate access to the peer to peer content stored in the provider user device through the content broker circuitry 330 to receive (e.g., download) the peer to peer content.

Figure 4:
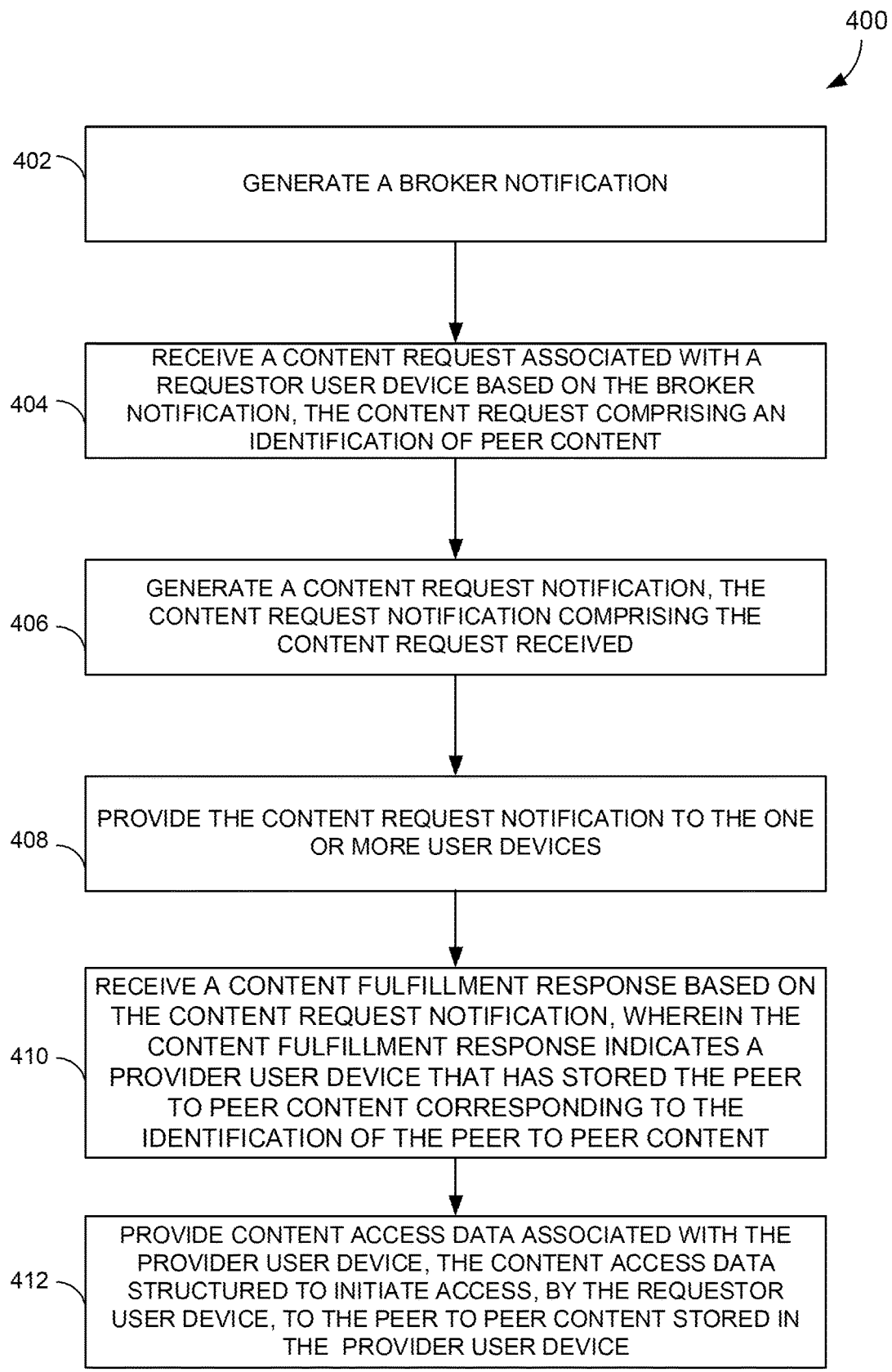
FIG. 4 depicts a flowchart of an exemplary method for initiating access to peer to peer content from at least one user device of a telecommunication network in accordance with an example embodiment.

FIG. 4 depicts a flow diagram of an exemplary method 400 for initiating access to peer to peer content from at least one user device of a telecommunication network, in accordance with implementations of the present disclosure. Initially at block 402 the content exchange system (e.g., a gNodeB or gNB) generates a broker notification to indicate the content exchange system is operable to receive one or more content requests. The content exchange system may provide the broker notification to one or more user device(s).

At block 404, a content request (e.g., a request for peer to peer content) associated with a user device (e.g., a requestor user device) is received based on the broker notification. The content request may include an identification of peer to peer content that the requestor user device is requesting to receive.

In some embodiments, a content request notification (e.g., an announcement of a request for peer to peer content) is generated at block 406. At block 408, the content request notification is provided to the one or more user devices communicatively coupled to the content exchange system. In some examples, the content request notification may be provided to the user device(s) within a geographic area associated with the content exchange system.

At block 410, a content fulfillment response is received based on the content request notification. The content exchange system may receive the content fulfillment response provided by the provider user device that has the peer to peer content stored. In this regard, the content fulfillment response may indicate the provider user device that has stored the peer to peer content (e.g., a video) identified in the content request. In some embodiments, the content fulfillment response may include the IP address of the provider user device. In further embodiments, the requestor user device may receive or otherwise retrieve the content fulfillment response from the content exchange system.

The content access data associated with the provider user device is provided at 412. The requestor user device may initiate access to the peer to peer content (e.g., a video) stored in the provider user device by utilizing the content access data. In turn, the requestor user device may download or otherwise receive the peer to peer content stored in the user device.

Figure 5:
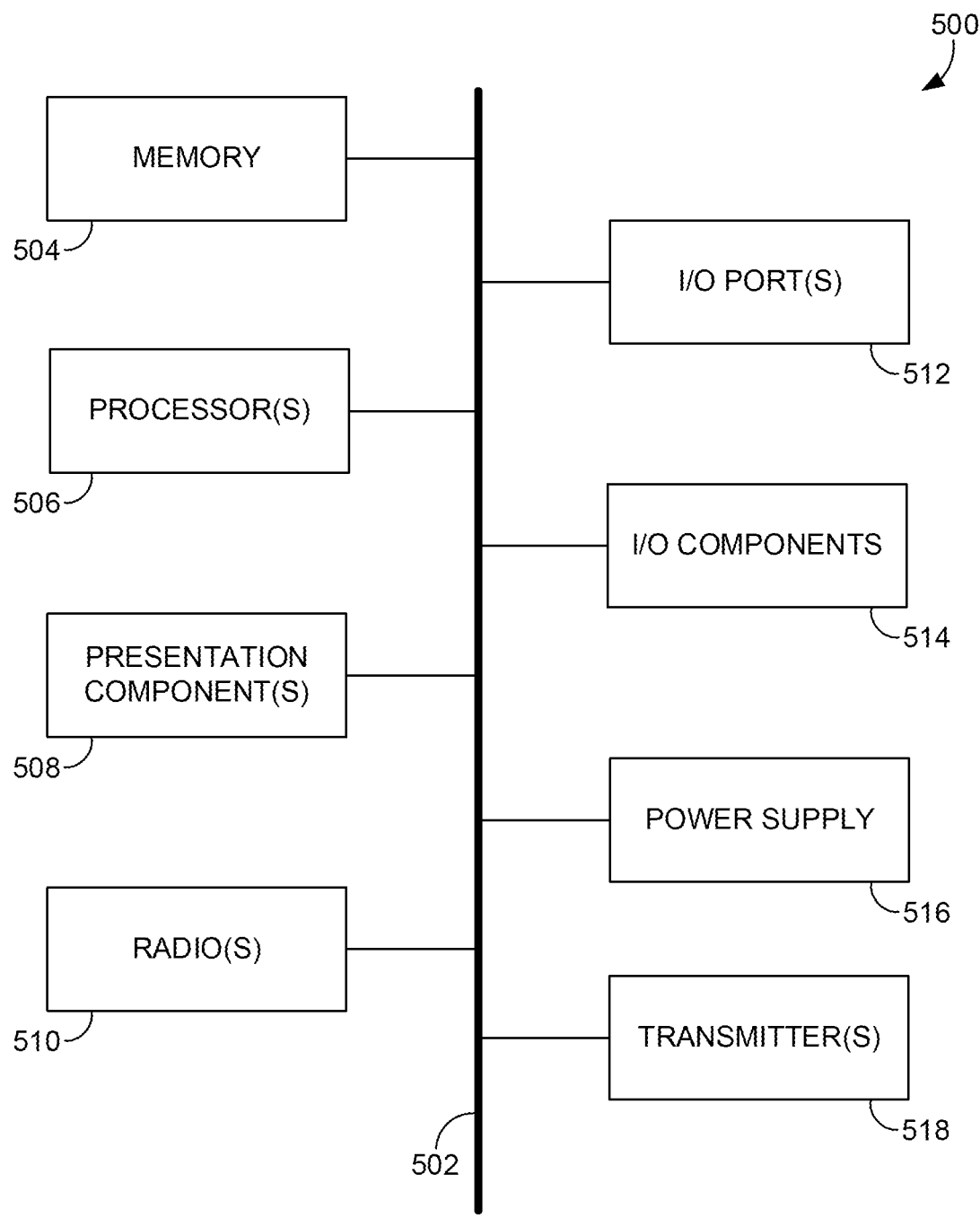
FIG. 5 depicts an exemplary computing device suitable for use in implementations of aspects herein.

Referring to FIG. 5, a block diagram of an example of a computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. In aspects, the computing device 500 may be a base station. In another embodiment, the computing device 500 may be UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 502 that directly or indirectly couples various components together. The bus 502 may directly or indirectly couple to one or more of memory 504, processor(s) 506, presentation component(s) 508 (if applicable), radio(s) 510, input/output (I/O) port(s) 512, input/output (I/O) component(s) 514, power supply 516, and/or transmitter(s) 518. Although the components of FIG. 5 are shown with lines for the sake of clarity, in reality, delineating various components is not so clear, and metaphorically, the lines would more accurately be grey and fuzzy. For example, one may consider a presentation component(s) 508 such as a display device to be one of I/O components 514. Also, the processor(s) 506 may include memory 504, in another example. The present disclosure hereof recognizes that such is the nature of the art, and reiterates that FIG. 5 is merely illustrative of an example of a computing device 500 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 504 may take the form of memory components described herein. Thus, further elaboration will not be provided here, but it should be noted that memory 504 may include any type of tangible medium that is capable of storing information, such as a database or data store. A database or data store may be any collection of records, files, or information encoded as electronic data and stored in memory 504, for example. In one embodiment, memory 504 may include a set of embodied computer-readable and executable instructions that, when executed, facilitate various functions or elements disclosed herein. These embodied instructions will variously be referred to as "instructions" or an "application" for short.

Processor(s) 506 may be multiple processors that receive instructions and process them accordingly. Presentation component(s) 508, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 510 represents one or more radios that facilitate communication with a wireless telecommunication network.

For example, radio(s) 510 may be connected to one or more antenna elements through a physical path. Illustrative wireless telecommunications technologies include CDMA, GPRS, TDMA, GSM, and the like. Radio(s) 510 might additionally or alternatively facilitate other types of wireless communications including Wi-Fi, WiMAX, 4G, 3G, 4G, LTE, mMIMO, 5G, NR, VOLTE, and/or other VOIP communications. As can be appreciated, in various embodiments, radio(s) 510 may be configured to concurrently support multiple technologies, as previously discussed herein. As such, each of many radio(s) 510 may be used to separately control portions of an antenna array, for example, where at least one portion utilizes a distinct technology relative to another portion in the same antenna array or at the same base station or cell site. A wireless telecommunication network might include an array of devices, which are not shown so as not to obscure more relevant aspects of the invention. Components such as a base station, a communications tower, or even access points (as well as other components) can provide wireless connectivity in some embodiments.

The input/output (I/O) ports 512 may take a variety of forms. Exemplary I/O ports 512 may include a USB jack, a stereo jack, an infrared port, a firewire port, other proprietary communications ports, and the like. Input/output (I/O) components 514 may comprise keyboards, microphones, speakers, touchscreens, and/or any other item usable to directly or indirectly input data into the computing device 500.

Power supply 516 may include batteries, fuel cells, and/or any other component that may act as a power source to supply power to the computing device 500 or to other network components, including through one or more electrical connections or couplings. Power supply 516 may be configured to selectively supply power to different components independently and/or concurrently.

Finally, regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regards to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A method for initiating access to peer to peer content from at least one user device of a telecommunication network, the method comprising:

generating, by a content exchange system communicatively coupled to one or more user devices, a broker notification, wherein the broker notification indicates the content exchange system is operable to receive one or more content requests;

receiving a content request associated with a requestor user device based on the broker notification, the content request comprising an identification of peer to peer content;

generating a content request notification, the content request notification comprising the content request received;

providing the content request notification to the one or more user devices;

receiving a content fulfillment response based on the content request notification, wherein the content fulfillment response indicates a provider user device that has stored the peer to peer content corresponding to the identification of the peer to peer content; and providing content access data associated with the provider user device, the content access data structured to initiate access, by the requestor user device, to the peer to peer content stored in the provider user device.

2. The method of claim 1, wherein the peer to peer content comprises at least one of an application, video, digital audio, virtual media, or image.

3. The method of claim 1, wherein the content request notification is provided via a System Information Block message.

4. The method of claim 1, wherein the content request notification comprises at least one of an IP address, port number, or content ID associated with the requestor user device.

5. The method of claim 1, wherein the content exchange system comprises a gNodeB.

6. The method of claim 1, wherein the content exchange system comprises at least one of a content broker server, user plan function, central unit, radio unit, or distribution unit.

7. The method of claim 6, wherein at least one of the content broker server or the user plan function receives the content request associated with the requestor user device.

8. The method of claim 1, wherein the content fulfillment response comprises at least one of an IP address, port number, or content ID associated with the provider user device.

9. The method of claim 1, wherein a telecommunications network comprises the content exchange system, and wherein the content exchange system is operable based on at least one of a 5G New Radio network or an Open Radio Access Network.

10. Computer-readable storage media having computer-executable instructions embodied thereon that, when executed by one or more processors, cause the processors to:
generate, by a content exchange system communicatively coupled to one or more user devices, a broker notification, wherein the broker notification indicates the content exchange system is operable to receive one or more content requests;
receive a content request associated with a requestor user device based on the broker notification, the content request comprising an identification of peer to peer content;
generate a content request notification, the content request notification comprising the content request received;
provide the content request notification to the one or more user devices;
receive a content fulfillment response based on the content request notification, wherein the content fulfillment response indicates a provider user device that has stored the peer to peer content corresponding to the identification of the peer to peer content; and
provide content access data associated with the provider user device, the content access data structured to initiate access, by the requestor user device, to the peer to peer content stored in the provider user device.

11. The computer-readable storage media of claim 10, wherein the peer to peer content comprises at least one of an application, video, digital audio, or image.

12. The computer-readable storage media of claim 10, wherein the content request notification is provided via a System Information Block message.

13. The computer-readable storage media of claim 10, wherein the content request notification comprises at least one of an IP address, port number, or content ID associated with the requestor user device.

14. The computer-readable storage media of claim 10, wherein the content exchange system comprises a gNodeB.

15. The computer-readable storage media of claim 10, wherein the content exchange system comprises at least one of a content broker server, user plan function, central unit, radio unit, or distribution unit, and wherein at least one of the content broker server or the user plan function receives the content request associated with the requestor user device.

16. The computer-readable storage media of claim 10, wherein the content fulfillment response comprises at least one of an IP address, port number, or content ID associated with the provider user device.

17. A system for accessing peer to peer content from at least one user device of a telecommunication network, the system comprising:
a requestor user device; and
a cell site comprising a content exchange system communicatively coupled to the requestor user device and a provider user device, the requestor user device structured to:
receive a broker notification, wherein the broker notification indicates the content exchange system is operable to receive one or more content requests;
generate a content request based on the broker notification, the content request comprising an identification of peer to peer content;
receive a content fulfillment response based on the content request, wherein the content fulfillment response indicates the provider user device that has stored the peer to peer content;
receive content access data associated with the provider user device, the content access data structured to initiate access to the peer to peer content stored in the provider user device; and
based on the content access data, receive the peer to peer content stored in the provider user device.

18. The system of claim 17, wherein the peer to peer content comprises at least one of an application, video, digital audio, virtual media, or image.

19. The system of claim 17, wherein the peer to peer content is stored in the requestor user device.

20. The system of claim 17, wherein the content request notification comprises an announcement of the content request.

* * * * *